July 5, 1966 W. JONES 3,259,820
COMPUTER APPARATUS
Original Filed March 14, 1961
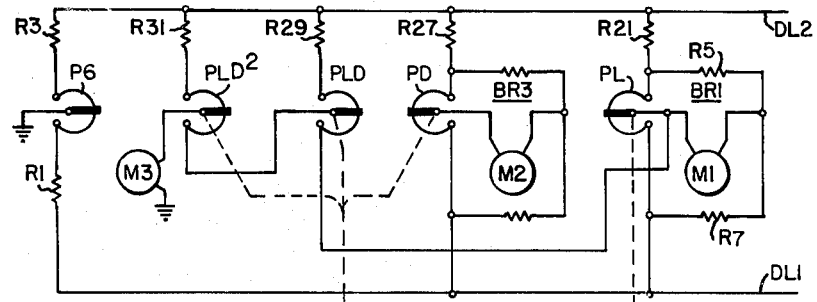
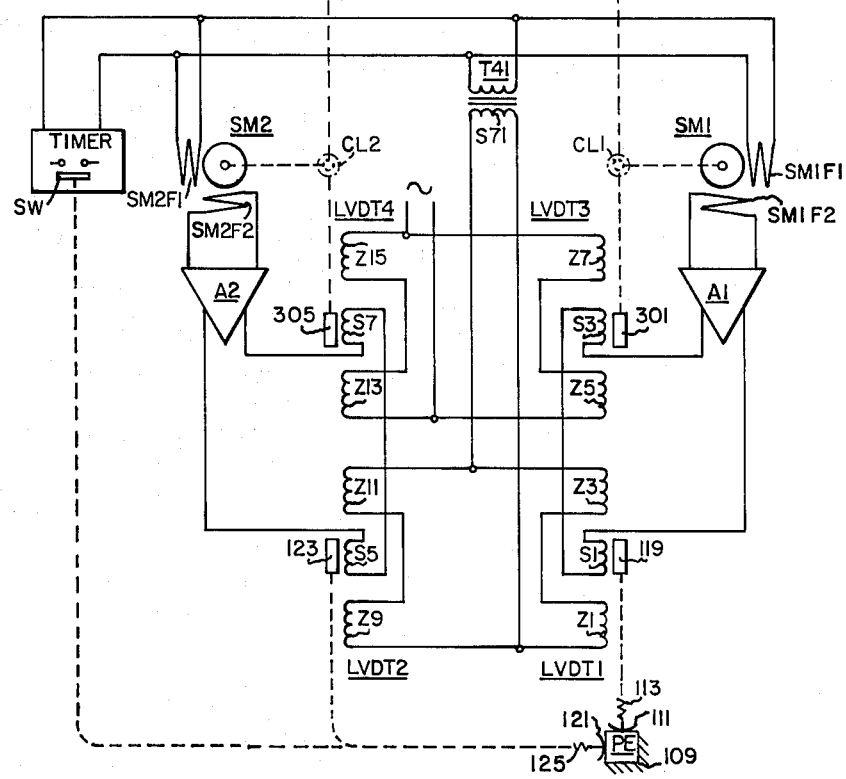

United States Patent Office 3,259,820
Patented July 5, 1966

3,259,820
COMPUTER APPARATUS
Wallace Jones, Saltsburg, Pa., assignor to Nuclear Materials and Equipment Corporation, Apollo, Pa., a corporation of Pennsylvania
Original application Mar. 14, 1961, Ser. No. 108,220. Divided and this application Dec. 2, 1964, Ser. No. 423,885
4 Claims. (Cl. 318—28)

This application is a division of application Serial No. 108,220 filed March 14, 1961.

This invention relates to the computer art and has particular relationship to the computers particularly suitable for dimensional measurement and computation. In its specific aspects this invention concerns itself with computers peculiarly suitable for the detection by analogue computation of small deviations in density of objects from a standard or norm.

Nuclear reactors include fuel assemblies the basic fuel element of which is a pellet of a fissionable material. It is essential that the density of these elements be maintained within tight tolerances to avoid over or under concentration of neutronic reaction. It is an object of this invention to provide computer apparatus, particularly suitable for use in the classification of neutronic pellets, for precise comparison of the volume of an object or article with a norm or standard. It is a still further object of this invention to provide such apparatus for precise detection of the deviation of the weight of an object from a standard. It is an additional object of this invention to provide a computer, relatively simple in its structure and operation, and particularly suitable for use in processing neutronic pellets, for determining density deviation of an object from its weight and volume deviation.

In accordance with this invention measurement is effected with the aid of linear variable differential transformers herein designated as LVDT's. Such a transformer usually includes a primary comprising a pair of oppositely connected windings, a secondary and a movable core. The primary may be supplied with alternating current and the core is movable by the measuring mechanism. With the core properly centered there is no output in the secondary; with the core displaced from the center, voltage dependent on the displacement is induced in the secondary. The measurement is effected by measuring or balancing the induced secondary voltage.

The pellets to which this invention is particularly applicable are small circular cylinders. In this case the determinative dimensions are the length and the diameter of each pellet.

In accordance with the specific aspects of this invention the length and diameter of each pellet are gauged by caliper-like elements connected to set the cores respectively of associated linear variable differential transformers. The output of the length LVDT is compared with the output of another LVDT and the difference balanced to zero by a servo motor operating on the core of the latter. This motor sets the length L on a suitable impedance, specifically a potentiometer. Similarly the output of the diameter LVDT is compared to the output of a fourth LVDT and balanced by another motor. The latter motor sets the diameter, D. The volume of a pellet may be computed from L and D.

The invention in detail, both as to its organization and as to its method of operation, together with the objects and advantages thereof, will be better understood from the following description of specific embodiments of this invention taken in connection with the accompanying drawings, in which:

FIG. 1 is a schematic illustrating this invention; and

FIG. 2 is a fragmental view showing a modification of this invention.

The drawing shows the gauging of a pellet PE to determine its length or height (vertical dimension in the drawing) and its diameter (horizontal dimension in the drawing). The height or length of pellet PE is determined by measuring the distance between a movable feeler 111 and a flat base 109 on which the pellet is placed. The feeler 111 is urged against the pellet PE by a spring 113. The length of each pellet PE is gauged with the aid of LVDT1. LVDT1 has primaries Z1 and Z3, a secondary S1 and a core 119. The feeler 111 is connected to the core 119 of LVDT1.

The diameter is gauged with the aid of LVDT2. LVDT2 has primaries Z9 and Z11, a secondary S5 and a core 123. A feeler 121 is urged by a spring 125 against the wall of the pellet PE; the opposite point of the wall engages a flat surface 107. The diameter feeler 121 is connected to the core 123 of LVDT2 and is urged in a direction perpendicular to the wall 107 by the spring 125.

The apparatus shown in the drawing also includes a potentiometer PL for setting an analogue of the length of the pellet PE, potentiometer PD for setting an analogue of the diameter, and potentiometers PLD and PLD$^2$ for computing an analogue of the volume. These potentiometers are connected to be supplied with direct-current voltage of the order of 25 volts between conductors or buses DL1 and DL2. In normal operation this supply draws about 400 milliamperes and is regulated to $\pm.05\%$. An intermediate electrical point of this supply is grounded. This point is determined by a voltage divider including resistors R1 and R3 between which potentiometer P6 is interposed.

The length potentiometer PL is connected in a bridge network BR1 including resistors R5 and R7 and the branches of PL. This network BR1 is connected between DL1 and DL2 through a resistor R21. The output conjugate terminals of the network BR1 are the adjustable arm of PL and the junction of R5 and R7. These terminals are connected across a meter M1.

The arm of PL is controlled by a cam CL1 rotatable by a servo motor SM1 (FIG. 11C). The motor SM1 has fields SM1F1 and SM1F2. Field SM1F1 is supplied with an alternating potential which is controlled from a Timer, that in the parent application is shown as controlled by the Program Unit. The Timer is controlled from a switch SW, which is closed responsive to the positioning of pellet PE in gauge, and turns the potential on, after the pellet is in gauge, only during a predetermined time interval. Field SM1F2 is supplied with an unbalance during a gauging operation by reason of the unbalance of LVDT1. To compensate for the unbalance the Volume Deviation Unit includes LVDT3. LVDT3 has primaries Z5 and Z7, a secondary S3 and a core 301.

The primaries Z1 and Z3 of LVDT1 are supplied with an alternating potential from the same supply as SM1F1 through transformer T41, the secondary S71 of which typically supplies about six volts to Z1 and Z3. The primaries Z5 and Z7 are continuously supplied from the available supply usually through a transformer (not shown). LVDT1 is thus energized only during the gauging interval. The secondaries S1 and S3 are connected in series bucking relationship to the input of an amplifier A1. The output of this amplifier A1 is connected to supply field SM1F2. The core 301 of LVDT3 is connected to be controlled by cam CL1 together with the arm of PL.

LVDT1 is set by a factory or service adjustment so that the bridge BR1 in which PL is connected is balanced for a pellet PE of standard length. When a pellet of non-standard length is in gauge the potential of PL with respect to ground is negative if the length is less than standard and positive if it is higher than standard. The meter M1 measures the length deviation.

The diameter potentiometer PD is connected in a network BR3 similar to BR1 and the output conjugate terminals of the network BR3 are likewise connected to a meter M2. The bridge BR3 is supplied from DL1 and DL2 through a resistor R27. Bridge BR3 is balanced for standard diameter. The meter M2 measures the diameter deviation.

Potentiometer PLD is connected through a resistor R29 between the arm of PL and DL2 and PLD² through a resistor R31 between the arm of PLD and DL2. The arms of PD, PLD and PLD² are operable together from a cam CL2 rotatable by motor SM2 which has fields SM2F1 and SM2F2.

The Volume Deviation Unit includes LVDT4 which has primaries Z13 and Z15, a secondary S7 and core 305. The primaries Z9 and Z11 of LVDT2 are connected to be supplied in parallel with primaries Z1 and Z3 and the primaries Z13 and Z15 of LVDT4 are connected to be supplied in parallel with Z5 and Z7 from the alternating supply. The secondaries S5 and S7 are connected in series bucking to the input of amplifier A3. The output of amplifier A3 supplies field SM2F2. The core 305 of LVDT4 is connected to cam CL2 to be positioned with the arms PD, PLD, PLD². With BR1 and BR2 balanced, PLD² produces the voltage analogue of standard volume.

The potential on the arm of PLD² is balanced against the voltage derivable between the arm P6 and ground. The arm of P6 is connected to the arm of PLD² through meter M3. P6 is set so that when PLD² is at standard volume the potential between PLD² and ground is zero. The meter M3 measures volume deviation.

In the use of the apparatus the pellet PE is set in gauge and SW is closed. The timer is actuated and SM1F1, SM2F1, Z1 and Z3 and Z9 and Z11 are supplied with power until the timer times out. Any unbalance produced in LVDT1 and LVDT2 by the gauging of the pellet PE causes amplifiers A1 and A3 to supply outputs to SM1F2 and SM2F2 which consist of a commercial frequency potential superimposed on direct-current potential. Motors SM1 and SM2 now rotate so that the slave LVDT's, LVDT3 and LVDT4 counteract the unbalance produced in LVDT1 and LVDT2, respectively, by the length and diameter deviations of the pellet PE in gauge. The timing interval of the Timer is so selected that its timing interval is long enough to achieve the balance. When the balance is achieved amplifiers A1 and A3 supply only D.C. to SM1F2 and SM2F2 dynamically braking motors SM1 and SM2 so that they stop instantaneously.

This effect of the deenergization of SM1F2 and SM2F2 may be accentuated as shown in the drawing. A signal is derived from SM1F1 and SM2F2 through a filter FI1 and FI2, respectively. FI1 and FI2 are tuned to the alternating outputs of A1 and A3. The outputs of the filters FI1 and FI2 are injected into the control circuit which supplies alternating potential through the Timer to assure that this alternating potential is supplied only so long as A1 or A3 supply alternating current components.

With the motors SM1 and SM2 stopped the potentiometers PL and PD are in the positions set by cams CL1 and CL2, respectively. Meters M1, M2 and M3 now have readings corresponding to these settings. The length diameter and volume of the pellet PE has now been measured.

While preferred embodiments of this invention are disclosed herein many modifications thereof are feasible. This invention then is not to be restricted except insofar as is necessitated by the spirit of the prior art.

I claim as my invention:

1. Computer apparatus including a first linear variable differential transformer, a second linear variable differential transformer, a servo motor having a first winding and a second winding, said motor operating only on the flow of current through both said windings, timing means connected to said first winding for supplying current thereto for a predetermined time interval, means connecting both said transformers to said second winding for supplying current to said second winding on the occurrence of an unbalance between said transformers and means connecting said motor to said second transformer for reducing said unbalance on the supply of current as aforesaid to said first and second windings, said unbalance being substantially suppressed during said interval.

2. Computer apparatus including a first linear variable differential transformer, a second linear variable differential transformer, a servo motor having a first winding and a second winding, said motor operating only on the flow of current through both said windings, first means connected to said first winding for supplying current thereto, second means connecting both said transformers to said second winding for supplying current to said second winding on the occurrence of an unbalance between said transformers, means connecting said motor to said second transformer for reducing said unbalance on the supply of current as aforesaid to said first and second windings, and means connected to said first means and responsive to the substantial suppression of said unbalance for interrupting the supply of current to said first winding by said first means.

3. Apparatus for gauging a dimension of an object including gauging means, a servo motor having first and second quadrature windings, means responsive to the positioning of said body in gauging engagement with said gauging means for supplying alternating current to said first winding, means responsive to the object gauging operation of said gauging means for supplying alternating current to said second winding, dimensions measuring means connected in alternating-current controlling relationship with said second winding, and means responsive to said servo means for setting said measuring means so as to reduce the alternating current supplied to said second winding to zero.

4. Computer apparatus for setting the analogue of a parameter of an object comprising means to be connected to said object for determining said parameter, a first linear variable differential transformer responsive to said determining means to be set in accordance with said parameter, a second linear variable differential transformer, means connecting said transformers in balancing relationship, an unbalance being produced in said relationship on the setting of said first transformer in accordance with said parameter, a servo motor having a first and second quadrature winding, said motor operating only on the flow of current through both said windings, means connected to said first winding for supplying current to said first winding independently of said output windings, means connected to said transformers responsive to said unbalance produced during said setting of said first transformer as aforesaid for supplying current to said second winding to operate said motor, means connected to said motor responsive to the operation thereof to actuate said second transformer to return said first and second transformer to balancing relationship, and variable impedance means, actuable by said motor to be set in accordance with said return of said first and second transformers to balancing relationship.

References Cited by the Examiner
UNITED STATES PATENTS
2,611,812   9/1952   Hornfeck _____ 318—28 X JOHN F. COUCH, *Primary Examiner.*